(12) United States Patent
Takamura (10) Patent No.: US 9,280,345 B2
(45) Date of Patent: Mar. 8, 2016

(54) PIPELINE PROCESSOR INCLUDING LAST INSTRUCTION

(75) Inventor: Akihiro Takamura, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 13/193,540

(22) Filed: Jul. 28, 2011

(65) Prior Publication Data

US 2012/0054473 A1   Mar. 1, 2012

(30) Foreign Application Priority Data

Sep. 1, 2010 (JP) ................................. 2010-196090

(51) Int. Cl.
*G06F 9/30* (2006.01)
*G06F 9/38* (2006.01)

(52) U.S. Cl.
CPC ........ *G06F 9/30076* (2013.01); *G06F 9/30185* (2013.01); *G06F 9/3826* (2013.01); *G06F 9/3832* (2013.01); *G06F 9/3859* (2013.01); *G06F 9/3869* (2013.01)

(58) Field of Classification Search
CPC .................................................. G06F 9/3826
USPC ....................................................... 712/218
See application file for complete search history.

(56) References Cited

U.S. PATENT DOCUMENTS

| | | | |
|---|---|---|---|
| 6,292,884 B1 * | 9/2001 | Tran et al. ...................... | 712/216 |
| 2001/0004755 A1 * | 6/2001 | Levy et al. ...................... | 712/217 |
| 2010/0169610 A1 | 7/2010 | Fukai et al. ..................... | 712/200 |
| 2010/0199074 A1 * | 8/2010 | Gemmeke et al. ............ | 712/220 |

FOREIGN PATENT DOCUMENTS

WO   2007/083421   7/2007

OTHER PUBLICATIONS

Takamura, Hiroshi, Koji Inoue, and Vasily G. Moshnyaga. "Register file energy reduction by operand data reuse." Integrated Circuit Design. Power and Timing Modeling, Optimization and Simulation. Springer Berlin Heidelberg, 2002. 278-288.*
H. Takamura, et al., "Reducing Power Consumption of Register Files through Operand Reuse", Information Processing Society of Japan, pp. 13-18, (Aug. 22, 2002) (with English Abstract).

* cited by examiner

*Primary Examiner* — Andrew Caldwell
*Assistant Examiner* — Keith Nielsen
(74) *Attorney, Agent, or Firm* — Fitzpatrick, Cella, Harper & Scinto

(57) ABSTRACT

There is provided a processor comprising a plurality of registers, an acquisition unit, a calculation unit, a pipeline register, and a storage unit, wherein in a case in which a register indicated by source register information included in a second instruction and a register indicated by destination register information included in a first instruction match, and the second instruction or an instruction that precedes to the second instruction designates the second instruction as the last instruction that uses the calculated value obtained in accordance with the first instruction, the storage unit does not store the calculated value stored in the pipeline register in a register indicated by destination register information included in the first instruction, and stores, in other cases, the calculated value stored in the pipeline register in the register indicated by the destination register information included in the first instruction.

14 Claims, 3 Drawing Sheets

PIPELINE PROCESSOR INCLUDING LAST INSTRUCTION

BACKGROUND OF THE INVENTION

1. Field of the Invention

The present invention relates to technology for realizing a processor that has low power consumption and uses a pipeline processing system.

2. Description of the Related Art

Generally, a pipeline processing system is used in order to enhance the processing performance of a processor. In a processor using a pipeline processing system, when a source operand value necessary for execution of an instruction is to be acquired, if the newest source operand value exists in a pipeline, that value existing in the pipeline is acquired, rather than a value that exists in a register file. This is called "operand forwarding" or "operand bypassing". In this way, before a calculated value obtained in accordance with a preceding instruction is written in the register file, a next instruction can be executed using the newly calculated value.

It is not necessary to read out a value from the register file when operand forwarding is performed. Further, if it is known that a calculated value is operand-forwarded, and does not need to be read out after that, it is not necessary to write that calculated value in the register file. It is possible to reduce the power consumption of a processor by reducing reading/writing of a value from/to the register file.

According to a method disclosed in Non-Patent Document 1 ("Reducing Power Consumption of Register Files through Operand Reuse", Information Processing Society of Japan Research Report, Computer Architecture Research Group Report 2002(81), Aug. 22, 2002: pp. 13-18), a case is detected in which a destination register for a preceding instruction and a source operand register and a destination register for a succeeding instruction match. In this case, a calculated value obtained in accordance with the preceding instruction is operand-forwarded to the succeeding instruction. Moreover, a register value is updated in accordance with the succeeding instruction, and thus the calculated value obtained in accordance with the preceding instruction will not be read out after that. Specifically, the succeeding instruction designates that the calculated value obtained in accordance with the preceding instruction will no longer be read out. Accordingly, the calculated value obtained in accordance with the preceding instruction does not need to be stored in the register file.

According to a method in Patent Document 1 (International Publication WO 2007/083421), when a calculated value obtained in accordance with a preceding instruction is operand-forwarded, it is defined in the preceding instruction whether or not that calculated value obtained in accordance with the preceding instruction is stored in a register file. Specifically, the preceding instruction designates that the calculated value obtained in accordance with that instruction will no longer be read out after operand forwarding.

According to the method in Non-Patent Document 1, if a succeeding instruction designates both a destination register and a source operand register, it can be designated that a calculated value obtained in accordance with a preceding instruction will no longer be read out. Accordingly, if the succeeding instruction is an instruction that does not designate a destination register, such as a compare instruction, a store instruction to a memory, or a branch instruction, it cannot be designated that a calculated value obtained in accordance with the preceding instruction will no longer be read out.

If a calculated value obtained in accordance with a preceding instruction is operand-forwarded to two or more succeeding instructions, it is not possible to omit the storing of that calculated value in a register file unless it is confirmed that the last operand forwarding has succeeded. However, a method of enabling this is not disclosed in International Publication WO 2007/083421. Further, in the method in International Publication WO 2007/083421, whether or not the writing to a register file is necessary is indicated in each preceding instruction. Thus, according to the method in International Publication WO 2007/083421, an average instruction bit length and the program size are increased, and power consumption is also increased.

SUMMARY OF THE INVENTION

The present invention provides a processor that can be operated using a program having a smaller size, and which requires lower power consumption.

According to one aspect of the invention, a processor that performs pipeline processing on an instruction comprises: a plurality of registers configured to store a result obtained by executing an instruction; an acquisition unit configured to acquire an instruction; a calculation unit configured to acquire a calculated value by performing calculation, wherein the calculation is designated by an operation code designating a type of processing, which operation code is included in the instruction acquired by the acquisition unit, and wherein the calculation uses an operand acquired in accordance with source register information designating a register that stores the operand used for calculation, which source register information is included in the instruction acquired by the acquisition unit, and that designates; a pipeline register that stores the calculated value obtained by the calculation unit; and a storage unit that stores, in accordance with destination register information designating a register that is to store the calculated value, which destination register information is included in the instruction acquired by the acquisition unit, the calculated value stored in the pipeline register in the designated register, wherein in a case in which a first instruction including the destination register information that designates a register that is to store the calculated value, and a second instruction that does not include the destination register information, are input to the processor, and a calculated value obtained in accordance with the first instruction is stored in the pipeline register when the calculation unit performs calculation in accordance with the second instruction, if a register indicated by the source register information included in the second instruction and a register indicated by the destination register information included in the first instruction match, the calculation unit acquires the calculated value stored in the pipeline register as an operand used for the second instruction, and in a case in which the register indicated by the source register information included in the second instruction and the register indicated by the destination register information included in the first instruction match, and the second instruction or an instruction that precedes to the second instruction designates the second instruction as the last instruction that uses the calculated value obtained in accordance with the first instruction, the storage unit does not store the calculated value stored in the pipeline register in the register indicated by the destination register information included in the first instruction, and stores, in other cases, the calculated value stored in the pipeline register in the register indicated by the destination register information included in the first instruction.

According to the above aspect of the invention, a processor can be operated using a program having a smaller size and requires lower power consumption.

Further features of the present invention will become apparent from the following description of exemplary embodiments with reference to the attached drawings.

DESCRIPTION OF THE EMBODIMENTS

Embodiment 1

In the present embodiment, in a case in which a plurality of registers exist as in a case of using general registers in a processor, each register is identified using a register number. Valid registers 172 and 182, Temp registers 173 and 183, and control registers 174 and 184 have 0 or 1 as a value. These registers have 1 as a value in a set state. Further, these registers have 0 as a value in a clear state.

Figure 1:
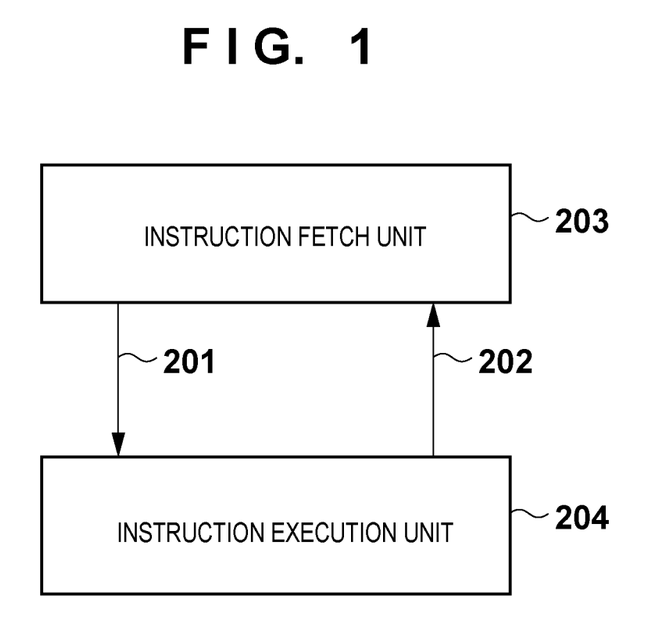
FIG. 1 is a diagram showing the overall configuration of a processor according to Embodiment 1.

FIG. 1 shows an example of a processor according to the present embodiment. The processor according to the present embodiment can perform pipeline processing on an input instruction. The processor according to the present embodiment includes an instruction fetch unit 203 and an instruction execution unit 204. The instruction fetch unit 203 fetches an instruction (acquisition unit). Then, the instruction fetch unit 203 sends the fetched instruction to the instruction execution unit 204 as instruction information 201. The instruction execution unit 204 executes the received instruction. If the instruction execution unit 204 executes a branch instruction, the instruction execution unit 204 sends a new instruction fetch address to the instruction fetch unit 203 as branching information 202.

Figure 2:
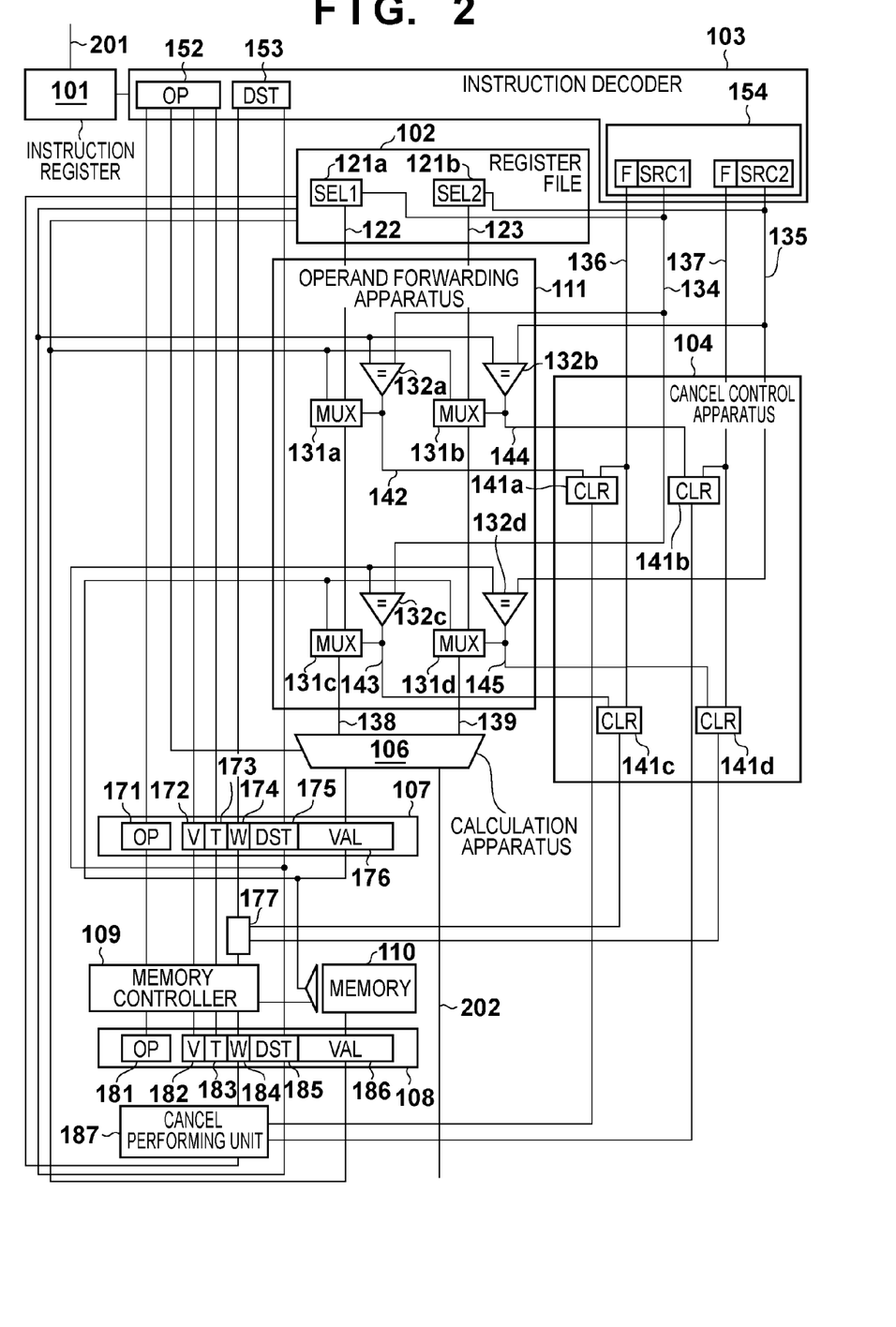
FIG. 2 is a diagram showing an instruction execution unit according to Embodiment 1.

FIG. 2 shows an example of the instruction execution unit 204 according to the present embodiment. In the present embodiment, processing performed by the instruction execution unit 204 is divided into a calculation stage, a memory stage, and a register file writing stage. Even if processing performed by the instruction execution unit 204 is divided into stages using a different method, those skilled in the art will be able to modify the present embodiment and utilize the modified embodiment. Further, it is assumed that pipeline stall will not occur in the present embodiment in order to simplify a description. However, those skilled in the art will be able to incorporate an existing method for handling pipeline stall into the present embodiment.

An instruction register 101 receives the instruction information 201 from the instruction fetch unit 203. Then, the instruction register 101 stores the instruction information 201. It is possible to acquire an operation code, destination register information, and source operand register information (source register information) from the instruction information 201. In the present embodiment, it is possible to further acquire, from the instruction information 201, information that indicates whether or not a value stored in a source operand register will be referred to again after the instruction is executed.

If a new instruction is stored in the instruction register 101, an instruction decoder 103 decodes that instruction stored in the instruction register 101. The instruction decoder 103 includes an operation code decoder 152, a destination register decoder 153, and a source register decoder 154.

The operation code decoder 152 decodes an operation code in an instruction. An operation code specifies the type of instruction. Moreover, the operation code decoder 152 outputs a calculation control signal to a calculation apparatus 106. For example, if an instruction stored in the instruction register 101 is an add instruction, a subtract instruction, or an AND instruction, the operation code decoder 152 causes the calculation apparatus 106 to perform addition, subtraction, or AND calculation by outputting a calculation control signal to the calculation apparatus.

Further, the result of processing performed by the operation code decoder 152 is stored in an operation code register 171, the Valid register 172, and the Temp register 173 in a first pipeline register 107. The operation code decoder 152 calculates an operation code necessary at the memory stage based on the content of the instruction register 101. Then, the operation code decoder 152 sets the calculated operation code in the operation code register 171. Moreover, the operation code decoder 152 sets the Valid register 172 if the instruction in the instruction register 101 is valid.

The operation code decoder 152 determines whether or not data to be written to a register file will be defined at the calculation stage based on the content of the instruction register 101. If such data will be defined, the operation code decoder 152 sets the control register 174 and clears the Temp register 173. On the contrary, if data to be written to the register file will not be defined at the calculation stage, the operation code decoder 152 sets the Temp register 173 and clears the control register 174.

Assume a case in which an AND instruction is stored in the instruction register 101, for example. In this case, data to be written into the register file is defined by calculation performed by the calculation apparatus 106 at the calculation stage. Accordingly, in this case, the operation code decoder 152 sets the control register 174 and clears the Temp register 173.

On the other hand, assume a case in which a load instruction is stored in the instruction register 101. In this case, the calculation apparatus 106 calculates a memory address used at the time of loading. Specifically, data to be written into the register file is not defined at the calculation stage. On the other hand, data to be written into the register file is defined at the memory stage. Accordingly, in this case, the operation code decoder 152 clears the control register 174 and sets the Temp register 173.

The destination register decoder 153 calculates the register number of a register into which a processing result is written, based on the value in the instruction register 101. Then, the destination register decoder 153 stores that calculated register number in a destination register 175.

The source register decoder 154 calculates a register number 134 for a first source operand based on the value in the instruction register 101, and outputs that calculated register number. Further, the source register decoder 154 determines whether or not the first source operand will be acquired again after an instruction is executed. In other words, the source register decoder 154 determines whether or not the register indicated by the register number 134 is to be referred to again after the execution of the instruction indicated by the instruction information 201 and before the value in the register indicated by the register number 134 is updated. Whether or not the first source operand is to be acquired again after the instruction is executed is indicated in the instruction information 201, and can be decrypted by the source register decoder 154.

If the register will not be referred to, the source register decoder 154 outputs a holding-unnecessary signal 136. Similarly, for a second source operand, the source register decoder 154 outputs a register number 135 and a holding-unnecessary signal 137 with regard to the second source operand.

A register file 102 receives the register number 134 for the first source operand, and outputs a corresponding register value 122. Similarly, the register file 102 receives the register number 135 for the second source operand, and outputs a corresponding register value 123. An operand forwarding apparatus 111 selects one value from among the register value 122, a value stored in a data register 176, and a value stored in a data register 186. Then, the operand forwarding apparatus 111 outputs the selected value to the calculation apparatus 106 as a first source operand 138. Further, the operand forwarding apparatus 111 selects one value from among the register value 123, a value stored in the data register 176, and a value stored in the data register 186, and outputs the selected value to the calculation apparatus 106 as a second source operand 139. Processing performed by the operand forwarding apparatus 111 will be described below.

The calculation apparatus 106 performs calculation according to the first source operand 138, the second source operand 139, and the calculation control signal output by the operation code decoder 152 (calculation unit). Then, the calculation apparatus 106 stores the calculation result in the data register 176. The first pipeline register 107 includes the operation code register 171, the Valid register 172, the Temp register 173, and the control register 174. These registers 171 to 174 store data from the operation code decoder 152.

The first pipeline register 107 further includes the destination register 175 and the data register 176. The destination register 175 stores data from the destination register decoder 153. The data register 176 stores the calculation result obtained by the calculation apparatus 106.

The operation code register 171 holds an operation code. The Valid register 172 holds a value indicating whether or not an instruction in the instruction register 101 is valid. The Temp register 173 holds a value indicating whether or not data to be written into the register file has been defined. The control register 174 holds a value indicating whether or not the value stored in the data register 176 needs to be written into the register file.

A memory controller 109 refers to the value stored in the operation code register 171 in the first pipeline register 107. The memory controller 109 outputs a control signal to a memory 110 in accordance with the value that has been referred to. Further, the memory controller 109 outputs a value to be stored in the Valid register 182, the Temp register 183, and the control register 184 in accordance with the value that has been referred to.

When the operation code stored in the operation code register 171 indicates a load instruction or a store instruction, the memory controller 109 outputs a memory control signal to the memory 110, and causes the memory 110 to perform reading or writing. If the operation code stored in the operation code register 171 indicates an instruction other than those, the memory controller 109 outputs a memory control signal to the memory 110, and causes the memory to output an input to the memory 110 from the data register 176 as it is.

The memory controller 109 sets the content of the Valid register 172 in the Valid register 182. Further, if a load instruction is stored in the operation code register 171, data to be written into the register file is defined by the reading from the memory 110. Accordingly, if a load instruction is stored in the operation code register 171, the memory controller 109 clears the Temp register 183 and sets the control register 184.

On the other hand, if an instruction other than a load instruction is stored in the operation code register 171, the memory controller 109 sets the content of the Temp register 173 in the Temp register 183. Further, the memory controller 109 sets a value from a cancel performing unit 177 in the control register 184. The cancel performing unit 177 will be described below. The memory 110 performs a reading operation, a writing operation, or an operation of outputting the value in the data register 176 as it is, based on the memory control signal output by the memory controller 109. Then, the memory 110 outputs the result to the data register 186.

A second pipeline register 108 includes an operation code register 181, the Valid register 182, the Temp register 183, and the control register 184. These registers 181 to 184 store a value output by the memory controller 109. Further, the second pipeline register 108 includes a destination register 185 and the data register 186. The destination register 185 stores the same value as that in the destination register 175. The data register 186 stores a value from the memory 110.

The registers 181 to 186 store the same information as that in the registers 171 to 176 in the first pipeline register 107. A cancel performing unit 187 controls the writing of data in the data register 186 into the register file 102 based on the value in the control register 184 and the value from a cancel control apparatus 104. Processing performed by the cancel performing unit will be described below.

Next is a description of the operand forwarding apparatus 111. The operand forwarding apparatus 111 determines whether or not the register number 134 for the first source operand output from the source register decoder 154 matches the destination register 175 or 185. In the present embodiment, the operand forwarding apparatus 111 performs determination first with respect to the destination register 175 for an instruction that has been decoded most recently.

In the present embodiment, the operand forwarding apparatus 111 (132c) determines whether or not the register number 134 for the first source operand indicate the same register as the destination register 175 in the first pipeline register 107. If the registers are the same, the operand forwarding apparatus 111 (131c) outputs the value stored in the data register 176 in the first pipeline register to the calculation apparatus 106, as the first source operand 138. Further, the operand forwarding apparatus 111 (132c) outputs, to the cancel control apparatus 104, a signal 143 indicating that the value stored in the data register 176 in the first pipeline register has been forwarded.

Next is a description of a case in which the register number 134 for the first source operand indicates a register different from the destination register 175 in the first pipeline register 107. In this case, the operand forwarding apparatus 111 (132a) determines whether or not the register number 134 for the first source operand indicates the same register as the destination register 185 in the second pipeline register. If the registers are the same, the operand forwarding apparatus 111 (131a) outputs the value stored in the data register 186 in the second pipeline register to the calculation apparatus 106 (via 131c), as the first source operand 138. Further, the operand forwarding apparatus 111 (132a) outputs, to the cancel control apparatus 104, a signal 142 indicating that the value stored in the data register 186 in the second pipeline register has been forwarded.

Next is a description of a case in which the register number 134 for the first source operand indicates a register different from both the destination register 175 in the first pipeline register 107 and the destination register 185 in the second pipeline register 108. In this case, the operand forwarding apparatus 111 (131a, 131c) outputs the register value 122 read out from the register file 102 in accordance with the register number 134 for the first source operand, as the first source operand 138.

The operand forwarding apparatus 111 also performs the same processing on the second source operand. Specifically, the operand forwarding apparatus 111 (132d) determines whether or not the register number 135 for the second source operand indicates the same register as the destination register 175 in the first pipeline register 107. If the registers are the same, the operand forwarding apparatus 111 (131d) outputs, to the calculation apparatus 106, the value stored in the data register 176 in the first pipeline register, as the second source operand 139. Further, the operand forwarding apparatus 111 (132d) outputs, to the cancel control apparatus 104, a signal 145 indicating that the value stored in the data register 176 in the first pipeline register has been forwarded.

Next is a description of a case in which the register number 135 for the second source operand indicates a register different from the destination register 175 in the first pipeline register 107. In this case, the operand forwarding apparatus 111 (132b) determines whether or not the register number 134 for the second source operand indicates the same register as the destination register 185 in the second pipeline register. If the registers are the same, the operand forwarding apparatus 111 (131b) outputs the value stored in the data register 186 in the second pipeline register to the calculation apparatus 106 (via 131d), as the second source operand 139. Further, the operand forwarding apparatus 111 (132b) outputs, to the cancel control apparatus 104, a signal 144 indicating that the value stored in the data register 186 in the second pipeline register has been forwarded.

Next is a description of a case in which the register number 135 for the second source operand indicates a register different from both the destination register 175 in the first pipeline register 107 and the destination register 185 in the second pipeline register 108. In this case, the operand forwarding apparatus 111 (131b, 131d) outputs the register value 123 read out from the register file 102 in accordance with the register number 135 for the second source operand, as the second source operand 139.

Among the signals output from the operand forwarding apparatus 111 to the cancel control apparatus 104, the signals 142 and 143 indicate that forwarding has been performed for the first operand. Similarly, the signals 144 and 145 indicate that forwarding has been performed for the second operand. Further, the signals 142 and 144 indicate that data in the second pipeline register 108 has been forwarded. Similarly, the signals 143 and 145 indicate that data in the first pipeline register 107 has been forwarded.

The cancel control apparatus 104 determines whether or not the holding-unnecessary signals 136 and 137 have been output from the source register decoder 154. Further, the cancel control apparatus 104 determines whether or not the signals 142 to 145 indicating that forwarding has been performed have been output from the operand forwarding apparatus 111. If the signal 136 and the signal 142 or 143, or the signal 137 and the signal 144 or 145 have been output, the cancel control apparatus 104 sends a cancel signal to the cancel performing unit 177 or 187. In this way, the cancel control apparatus 104 cancels writing of data in the data registers 176 and 186 into the register file 102.

Next is a description of specific operation of the cancel control apparatus 104. If the signals 136 and 143 have been output, data in the data register 176 has been forwarded as the first source operand. Further, the first source operand (specifically, data in the data register 176) will not be referred to thereafter. In this case, the cancel control apparatus 104 (141c) sends a cancel signal to the cancel performing unit 177.

If the signals 136 and 142 have been output, data in the data register 186 has been forwarded as the first source operand. Further, the first source operand (specifically, data in the data register 186) will not be referred to thereafter. In this case, the cancel control apparatus 104 (141a) sends a cancel signal to the cancel performing unit 187.

If the signals 137 and 145 have been output, data in the data register 176 has been forwarded as the second source operand. Further, the second source operand (specifically, data in the data register 176) will not be referred to thereafter. In this case, the cancel control apparatus 104 (141d) sends a cancel signal to the cancel performing unit 177.

If the signals 137 and 144 have been output, data in the data register 186 has been forwarded as the second source operand. Further, the second source operand (specifically, data in the data register 186) will not be referred to thereafter. In this case, the cancel control apparatus 104 (141b) sends a cancel signal to the cancel performing unit 187.

If a cancel signal has not been sent from the cancel control apparatus 104, the cancel performing unit 177 outputs the value in the control register 174 to the memory controller 109. Then, the memory controller 109 sets the received value in the control register 184. On the other hand, if a cancel signal has been sent from the cancel control apparatus 104, the cancel performing unit 177 outputs the value "0" to the memory controller 109. Then, the memory controller 109 clears the control register 184.

If a cancel signal has not been sent from the cancel control apparatus 104, the cancel performing unit 187 outputs the value in the control register 184. On the other hand, if a cancel signal has been sent from the cancel control apparatus 104, the cancel performing unit 187 outputs the value "0".

At the register file writing stage, if the output from the cancel performing unit 187 is "1", the value in the control register 184 is stored in the register indicated by the value in the destination register 185 (storage unit). On the other hand, if the output from the cancel performing unit 187 is "0", writing into the register file is not performed. A register file writing apparatus (not shown) may perform this processing.

By the above operation, if it is indicated that after the execution of an instruction, a source operand register for this instruction will not be referred to again until the value in this source operand register is updated, and if the source operand for this instruction is forwarded from a pipeline register by the operand forwarding apparatus, the source operand (specifically, a value in the data register in the pipeline register) for this instruction will not be written into the register file. Accordingly, the writing of unnecessary data into the register file can be prevented, and thus the power consumption of the processor can be reduced.

In the present embodiment, the instruction decoder 103 is capable of acquiring information indicating whether or not the value stored in a source operand register will be referred to again after the execution of an instruction. This can be realized by adding such information to the instruction used to cause the processor to perform operation. This can be realized by extending an instruction set, for example.

A CMPX1 instruction will be described as an example, as an instruction to be added in the present embodiment. The CMPX1 instruction is basically the same as a CMP instruction of the Thumb 16-bit instruction set. However, the CMPX1 instruction designates that, after a value in a register indicated by the first source operand has been read out, that register value will not be read out until next writing to that register is performed. The source register decoder 154 outputs the holding-unnecessary signal 136, upon receipt of the CMPX1 instruction.

As described above, according to the present embodiment, even an instruction (second instruction) that does not designate a destination register, such as a compare instruction (CMP instruction), can designate that a calculated value obtained in accordance with a preceding instruction will no longer be read out. Further, if a calculated value obtained in accordance with a preceding instruction (first instruction) is read out according to a plurality of succeeding instructions, it is possible to realize a configuration in which operand forwarding is performed a plurality of times by the last instruction designating that the calculated value obtained in accordance with the preceding instruction will no longer be read out.

Embodiment 2

The method in Embodiment 1 is combined with the method in Non-Patent Document 1 in the present embodiment. According to the method in Non-Patent Document 1, if a succeeding instruction (third instruction) designates both a destination register and a source operand register, it can be designated that a value in that source operand register will no longer be read out. On the other hand, according to the method in Embodiment 1, even in a case in which a destination register is not designated in a succeeding instruction, it can be designated that a value in the source operand register will no longer be read out.

Thus, in the present embodiment, in an instruction that does not designate a destination register, an instruction set is extended such that it can be designated that a value in the source operand register will no longer be read out. However, in order to satisfy a function call restriction, a value may need to be stored in a specific destination register. Accordingly, an instruction set may be extended such that an add instruction and a move instruction between registers can designate that the value in the source operand register will no longer be read out. In Table 1 below, an instruction set has also been extended with regard to a move instruction between registers.

Table 1 shows the numbers of added instruction types in conventional technology and the present invention using the Thumb® 16-bit instruction set by ARM Ltd. as an example. In Table 1, an instruction in which a source operand is an immediate operand and an instruction in which a source operand is not an immediate operand are counted as other instructions even if the same instruction mnemonic is used therefor. Similarly, an instruction that designates a register that is not a general register such as a PC or SP register for a source operand and an instruction that does not designate such a register are counted as other instructions even if the same instruction mnemonic is used therefor. Note that in load/store instructions that designate a plurality of registers and a push instruction and a pop instruction, a plurality of registers are designated and multicycle operation is performed. Thus, these instructions are excluded from Table 1.

The numbers of instruction types added in the case of the method disclosed in Patent Document 1 are shown as the numbers of instruction types added in conventional technology. By adding instruction types whose numbers are shown in Table 1 in accordance with the method in Patent Document 1, it can be designated that a calculated value obtained in accordance with a preceding instruction will not be written in the register file if that calculated value is operand-forwarded once. In order to designate that a calculated value will not be written if that calculated value is operand-forwarded twice or more, it is necessary to further add instruction types.

By adding the instruction types whose numbers are shown in Table 1 in accordance with the present embodiment, it can be designated that the first source operand will not be written into the register file if the value thereof can be acquired by operand forwarding. In a case in which it is to be designated that the second source operand will not be written into the register file if the value thereof can be acquired by operand forwarding, instruction types can be further added.

TABLE 1

| Instruction type | Mnemonics of Thumb 16-bit instruction | Number of instruction types (Thumb 16-bit) | Number of added instruction types (WO 2007/083421) | Number of added instruction types (Embodiment 2) |
|---|---|---|---|---|
| Move | MOVS, MOV | 4 | 4 | 4 |
| Add | ADDS, ADDD, ADC, ADR | 8 | 8 | 0 |
| Subtract | SUBS, SBCS, SUB, RSBS | 6 | 6 | 0 |
| Multiply | MULS | 1 | 1 | 0 |
| Compare | CMP, CMN | 3 | 0 | 3 |
| Logical calculation | ANDS, EORS, ORRS, BICS, MVNS, TST | 6 | 6 | 1 |
| Shift/Rotate | LSLS, LSRS, ASRS, RORS | 7 | 7 | 0 |
| Load | LDR, LDRH, LDRB, LDRH, LDRSH, LDRB, LDRSB | 10 | 10 | 0 |
| Store | STR, STRH, STRB | 7 | 0 | 7 |
| Bit extension | SXTH, SXTB, UXTH, UXTB | 4 | 4 | 0 |
| Bit reverse | REV, REV16, REVSH | 3 | 3 | 0 |
| Total number of added instructions | | | 48 | 14 |

Among six logical calculation instructions, the TST instruction does not allow a result to remain in a register, and thus an instruction corresponding to the TST instruction is added in accordance with the present embodiment. As shown in Table 1, according to the method in the present embodiment, the number of added instruction types can be decreased, compared to the case of using the method described in Patent Document 1. For example, according to the method in Patent Document 1, it is necessary to add 48 instructions to the Thumb 16-bit instruction set. On the other hand, it is sufficient to add 14 instructions according to the method in the present embodiment. Accordingly, an increase in an average instruction bit length and an increase in the program size can be suppressed. Thus, power consumption is reduced.

Below is a description of operation of the source register decoder 154 using the instruction set shown in Table 1. As described above, the source register decoder 154 outputs the holding-unnecessary signal 136 if it is determined that the value in a register that stores the first source operand will no longer be acquired until that value is updated. Moreover, the source register decoder 154 having the function disclosed in Non-Patent Document 1 determines whether the destination register number and the register number for the first source operand match. If the numbers match, the source register decoder 154 determines that the value in the register that stores the first source operand will no longer be acquired until that value is updated, and outputs the holding-unnecessary signal 136.

For example, an instruction, namely, ADDS R1, R1, #<imm> will be described. In this instruction, the register R1 is designated as both the destination register and the first source operand register. Accordingly, the register R1 will not be referred to until the value in the register R1 is changed in response to this instruction. Specifically, in a case in which R1 is designated as the destination register in a preceding instruction, and a calculated value obtained in accordance with the preceding instruction is operand-forwarded, the calculated value obtained in accordance with the preceding instruction will no longer be referred to, and thus this calculated value does not need to be stored in the register R1. Accordingly, in this case, the source register decoder 154 outputs the holding-unnecessary signal 136 for the first source operand.

On the other hand, according to an instruction, namely, ADDS R2, R1, #<imm>, the register R1 serving as the first source operand register is not updated. Accordingly, the value in the register R1 may be referred to again in a succeeding instruction. Therefore, the holding-unnecessary signal 136 for the first source operand is not output in this case. If the register R1 serving as the first source operand register is not referred to until the value is updated, it is sufficient to rewrite the program to ADDS R1, R1, #<imm>.

Embodiment 3

In Embodiment 1, an instruction specifies that until the value in a source operand register for this instruction is updated, this source operand register will not be referred to again. For this reason, new versions of some instructions were added to the instruction set. In the present embodiment, a prefix instruction is added to the instruction set. This prefix instruction specifies that until a value in a source operand register for an instruction to be executed next is updated, this source operand register will not be referred to again.

In the present embodiment, an instruction (prefix instruction) indicating that until a value in a first source operand register for an instruction to be executed next is updated, reading out therefrom will not be performed is added to the conventional instruction set. In the description below, this instruction serves as a LASTUSE1 instruction. Below is a description of a case in which this LASTUSE1 instruction is used together with the CMP instruction of the Thumb 16-bit instruction set.

The LASTUSE1 instruction can be used in an instruction sequence below, for example.

MOVS r1, #255
LASTUSE1
CMP r1, r2

In this instruction sequence, the LASTUSE1 instruction indicates that a value in the r1 register serving as the first source operand register for the CMP instruction to be executed after the LASTUSE1 instruction will not be read out until that value is updated after the CMP instruction. The value 255 is set in the register r1 according to the first MOVS instruction. Then, 255 that is the value in the register r1 is used in the CMP instruction. However, the LASTUSE1 instruction specifies that 255 that is the value in the register r1 will not be used after the CMP instruction. Accordingly, if the value 255 is operand-forwarded, the value 255 does not need to be written into the register r1.

Figure 3:
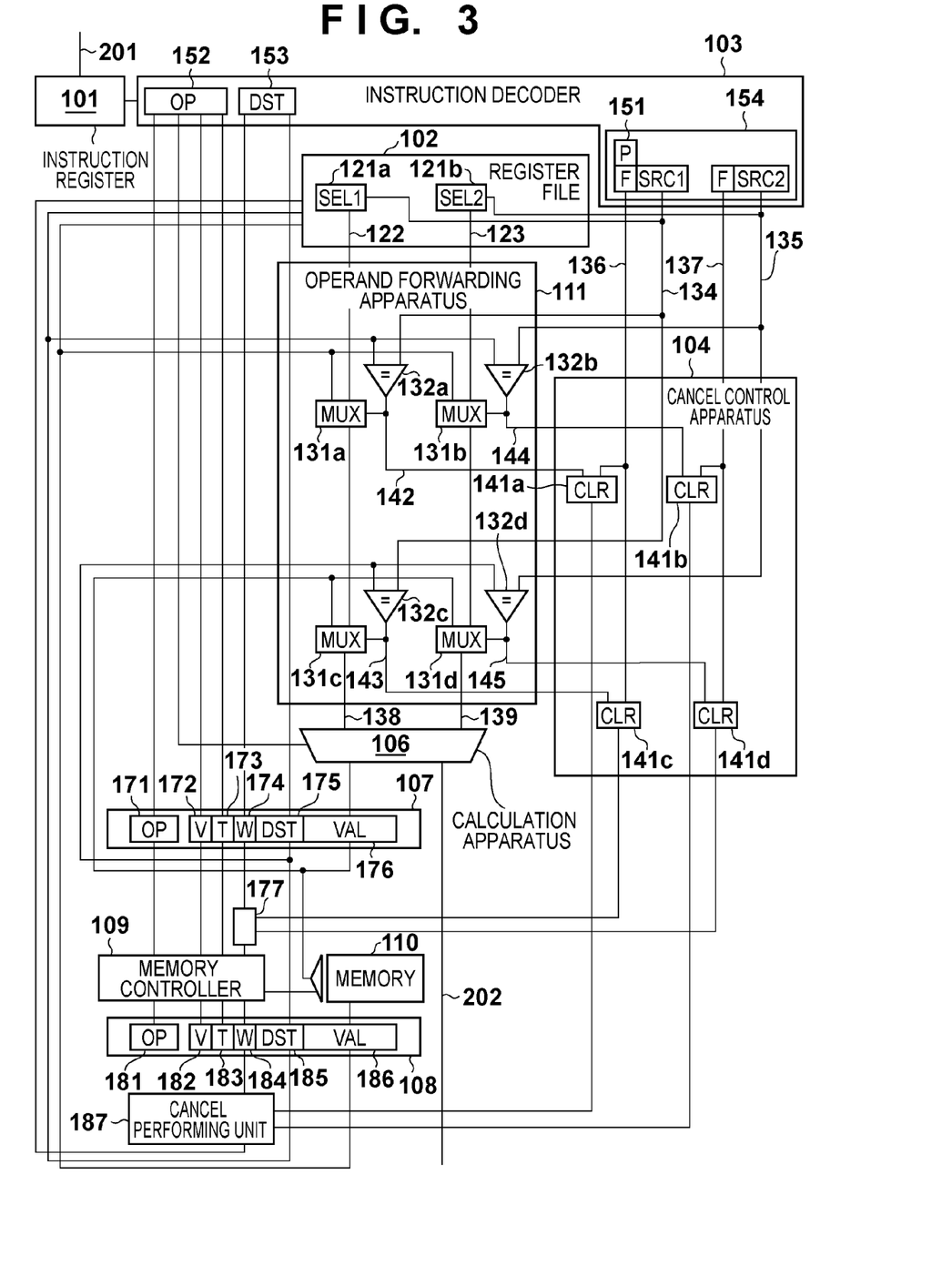
FIG. 3 is a diagram showing an instruction execution unit according to Embodiment 3.

FIG. 3 shows an example of an instruction execution unit of a processor according to the present embodiment. The present embodiment is similar to Embodiment 1. Below is a description of the differences from Embodiment 1. As in Embodiment 2, it is also possible to combine the method in Non-Patent Document 1 with that in the present embodiment. In the present embodiment, the source register decoder 154 has an instruction storage register 151.

When the instruction decoder 103 receives the LASTUSE1 instruction, the source register decoder 154 under instruction sets the instruction storage register 151. If the LASTUSE1 instruction is received, the instruction decoder 103 does not need to send information to the units in the processor such as the calculation apparatus 106 and the first pipeline register 107.

If the instruction decoder 103 receives an instruction subsequent to the LASTUSE1 instruction, the instruction decoder 103 decodes that instruction. Then, the instruction decoder 103 sends information to the units in the processor. At this time, the source register decoder 154 determines whether or not the instruction storage register 151 has been set.

If the instruction storage register 151 has been set, the source register decoder 154 outputs the holding-unnecessary signal 136 together with the register number 134 for the first source operand. Then, the source register decoder 154 clears the instruction storage register 151. If the instruction storage register 151 has not been set, the source register decoder 154 outputs the register number 134 for the first source operand, but does not output the holding-unnecessary signal 136.

Thus, in the present embodiment, it is possible to achieve suppressing an increase in the program size and reducing power consumption by adding one prefix instruction. In the present embodiment, an instruction has been added that specifies that the first source operand register will not be referred to again until a value in this source operand register for the instruction subsequent to the added instruction is updated. However, it is also possible to further add an instruction specifying that, with regard to a register other than the first source operand register, that register will not be referred to again until a value in that register is updated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-196090, filed Sep. 1, 2010, which is hereby incorporated by reference herein in its entirety.

What is claimed is:

1. A processor that performs pipeline processing on an instruction, the processor comprising:

an acquisition unit constructed to acquire the instruction which has an operation code specifying a type of the instruction and destination register information;

a pipeline register constructed to store a processing result based on the instruction acquired by the acquisition unit; and a storage control unit constructed to control a register to store the processing result stored in the pipeline register, wherein the register which stores the processing result is designated by the destination register information; and a control unit constructed to control processing based on a second instruction acquired by the acquisition unit and control storing of a processing result based on a first instruction acquired by the acquisition unit, wherein the control unit is further constructed to:
  determine whether both of conditions (i)-(ii) are satisfied
    (i) the second instruction indicates that the second instruction is for performing processing by using data stored in the register designated by the destination register information in the first instruction, and (ii) the operation code in the instruction acquired by the acquisition unit indicates that the second instruction is a last instruction for performing the processing by using data stored in the register designated by the destination register information in the first instruction; and
    in response to determining that both of conditions (i)-(ii) are satisfied, control the processing and the storing such that data used for the processing based on the second instruction is acquired from the pipeline register and the processing result based on the first instruction is not stored in the register designated by the destination register information in the first instruction,
  wherein whether to store the processing result based on the first instruction is determined based on an indication associated with the second instruction.

2. The processor according to claim 1, wherein the instruction acquired by the acquisition unit includes an operation code corresponding to a type of instruction, and the processor further comprises a processing unit constructed to perform the processing corresponding to the operation code included in the instruction acquired by the acquisition unit.

3. The processor according to claim 1, wherein the second instruction includes the register reference information indicating that the second instruction is the last instruction for performing the processing by using the data stored in the register designated by the destination register information in the first instruction.

4. The processor according to claim 1, wherein the control unit is further constructed to acquire first data from the pipeline register and second data from a register designated by a second operand, when the second instruction includes a first operand designating a register in which the first data used for the processing based on the second instruction is stored, the second instruction includes a second operand designating a register in which second data used for the processing based on the second instruction is stored, a register designated by the first operand and a register designated by the destination register information in the first instruction match, and a register designated by the second operand and a register designated by the destination register information in the first instruction does not match.

5. The processor according to claim 1, wherein the control unit is further constructed to control the processing such that the data used for the processing result based on the first instruction is stored in the register designated by the destination register information in the first instruction when the data used for the processing based on the second instruction is not acquired from the pipeline register, even when the instruction acquired by the acquisition unit includes register reference information indicating that the second instruction is the last instruction for performing processing by using data stored in the register designated by the destination register information in the first instruction.

6. The processor according to claim 1, wherein the instruction has an operation code specifying a type of the instruction, wherein the operation code works as the register reference information.

7. The processor according to claim 1, wherein the control unit is further constructed to:
  control processing based on the second instruction and control storing of a processing result based on the first instruction such that data used for the processing based on the second instruction is acquired from the pipeline register and the processing result based on the first instruction is not stored in the register designated by the destination register information in the first instruction, when the first and second instructions are acquired by the acquisition unit, the second instruction indicates that the second instruction is for performing processing by using data stored in the register designated by the destination register information in the first instruction, and the second instruction includes a first operation code which indicates that the second instruction is a last instruction for performing the processing by using data stored in the register designated by the destination register information in the first instruction; and
  control processing based on the second instruction and control storing of a processing result based on the first instruction such that data used for the processing based on the second instruction is acquired from the pipeline register and the processing result based on the first instruction is stored in the register designated by the destination register information in the first instruction, when the first and second instructions are acquired by the acquisition unit, the second instruction indicates that the second instruction is for performing processing by using data stored in the register designated by the destination register information in the first instruction, and the second instruction includes a second operation code which indicates that the second instruction is not a last instruction for performing the processing by using data stored in the register designated by the destination register information in the first instruction, wherein the first operation code and the second operation code specify the same type of instruction.

8. The processor according to claim 1, further comprising:
  an instruction decoder constructed to decode the instruction;
  an operand forwarder operatively connected to the instruction decoder and constructed to perform operand forwarding based on whether the second instruction indicates that the second instruction is for performing processing by using data stored in the register designated by the destination register information in the first instruction;
  a cancel controller operatively connected to the operand forwarder and constructed to control such that the processing result based on the first instruction is not stored in the register designated by the destination register information in the first instruction; and
  a canceller operatively connected to the cancel controller, a pipeline register, and a register file, and constructed to control writing data stored in the pipeline register to the register file under control of the cancel controller.

9. A processor control method comprising steps of:
  acquiring an instruction which has an operation code specifying a type of the instruction and destination register information;
  storing a processing result based on the instruction in a pipeline register;

controlling the register to store the processing result stored in the pipeline register, wherein the register which stores the processing result is designated by the destination register information; and controlling processing based on a second instruction acquired by the acquisition step and controlling storing of a processing result based on a first instruction acquired by the acquisition step, including determining whether both of conditions (i)-(ii) are satisfied: (i) the second instruction indicates that the second instruction is for performing processing by using data stored in the register designated by the destination register information in the first instruction, and (ii) the operation code in the instruction acquired in the acquiring step indicates that the second instruction is a last instruction for performing the processing by using data stored in the register designated by the destination register information in the first instruction; and in response to determining that both of conditions (i)-(ii) are satisfied, controlling the processing and the storing such that data used for the processing based on the second instruction is acquired from the pipeline register and the processing result based on the first instruction is not stored in the register designated by the destination register information in the first instruction, wherein whether to store the processing result based on the first instruction is determined based on an indication associated with the second instruction.

10. The method according to claim 9, wherein the instruction acquired in the acquiring step includes an operation code corresponding to a type of instruction, and the method further comprises performing the processing corresponding to the operation code included in the instruction acquired in the acquiring step.

11. The method according to claim 9, wherein the second instruction includes the register reference information indicating that the second instruction is the last instruction for performing the processing by using the data stored in the register designated by the destination register information in the first instruction.

12. The method according to claim 9, wherein first data are acquired from the pipeline register and second data are acquired from a register designated by the second operand in the processing, when the second instruction includes a first operand designating a register in which the first data used for the processing based on the second instruction is stored, the second instruction includes a second operand designating a register in which the second data used for the processing based on the second instruction is stored, a register designated by the first operand and a register designated by the destination register information in the first instruction match, and a register designated by the second operand and a register designated by the destination register information in the first instruction does not match.

13. A processor that performs pipeline processing on an instruction, the processor comprising:
an acquisition unit constructed to acquire the instruction which has an operation code specifying a type of the instruction and destination register information;
a pipeline register constructed to store a processing result based on the instruction acquired by the acquisition unit; and
a storage control unit constructed to control a register to store the processing result stored in the pipeline register, wherein the register which stores the processing result is designated by the destination register information; and a control unit constructed to control processing based on a second instruction acquired by the acquisition unit and control storing of a processing result based on a first instruction acquired by the acquisition unit, wherein the control unit is further constructed to:
determine whether both of conditions (i)-(ii) are satisfied: (i) the second instruction indicates that the second instruction is for performing processing by using data stored in the register designated by the destination register information in the first instruction, and (ii) the operation code in the instruction acquired by the acquisition unit indicates that the second instruction is a last instruction for performing the processing by using data stored in the register designated by the destination register information in the first instruction; and
in response to determining that both of the conditions (i)-(ii) are satisfied, control the processing and the storing such that data used for the processing based on the second instruction is acquired from the pipeline register and the processing result based on the first instruction is not stored in the register designated by the destination register information in the first instruction,
wherein the control unit is further constructed to:
control processing based on the second instruction and control storing of a processing result based on the first instruction such that data used for the processing based on the second instruction is acquired from the pipeline register and the processing result based on the first instruction is not stored in the register designated by the destination register information in the first instruction, when the first and second instructions are acquired by the acquisition unit, the second instruction indicates that the second instruction is for performing processing by using data stored in the register designated by the destination register information in the first instruction, and the second instruction is immediately preceded by a third instruction which indicates that the second instruction is the last instruction for performing the processing by using data stored in the register designated by the destination register information in the first instruction; and
control processing based on the second instruction and control storing of a processing result based on the first instruction such that data used for the processing based on the second instruction is acquired from the pipeline register, and the processing result based on the first instruction is stored in the register designated by the destination register information in the first instruction, when the first and second instructions are acquired by the acquisition unit, the second instruction indicates that the second instruction is for performing processing by using data stored in the register designated by the destination register information in the first instruction, and the second instruction is not immediately preceded by the third instruction.

14. A processor control method comprising steps of:
acquiring an instruction which has an operation code specifying a type of the instruction and destination register information;
storing a processing result based on the instruction in a pipeline register;
controlling the register to store the processing result stored in the pipeline register, wherein the register which stores the processing result is designated by the destination register information; and
controlling processing based on a second instruction acquired in the acquiring step and controlling storing of a processing result based on a first instruction acquired in the acquiring step, including determining whether both of conditions (i)-(ii) are satisfied: (i) the second instruction indicates that the second instruction is for performing processing by using data stored in the register designated by the destination register information in the first instruction, and (ii) the operation code in the instruction acquired in the acquiring step indicates that the second instruction is a last instruction for performing the processing by using data stored in the register designated by the destination register information in the first instruction; and in response to determining that both of the conditions (i)-(ii) are satisfied, controlling the processing and the storing such that data used for the processing based on the second instruction is acquired from the pipeline register and the processing result based on the first instruction is not stored in the register designated by the destination register information in the first instruction, wherein the controlling the register and the controlling the processing includes:

controlling processing based on the second instruction and controlling storing of a processing result based on the first instruction such that data used for the processing based on the second instruction is acquired from the pipeline register and the processing result based on the first instruction is not stored in the register designated by the destination register information in the first instruction, when the first and second instructions are acquired by the acquisition unit, the second instruction indicates that the second instruction is for performing processing by using data stored in the register designated by the destination register information in the first instruction, and the second instruction is immediately preceded by a third instruction which indicates that the second instruction is the last instruction for performing the processing by using data stored in the register designated by the destination register information in the first instruction; and controlling processing based on the second instruction and controlling storing of a processing result based on the first instruction such that data used for the processing based on the second instruction is acquired from the pipeline register, and the processing result based on the first instruction is stored in the register designated by the destination register information in the first instruction, when the first and second instructions are acquired by the acquisition unit, the second instruction indicates that the second instruction is for performing processing by using data stored in the register designated by the destination register information in the first instruction, and the second instruction is not immediately preceded by the third instruction.

\* \* \* \* \*